United States Patent
Kopesec

(10) Patent No.: US 7,157,633 B1
(45) Date of Patent: Jan. 2, 2007

(54) SIMULATED STRINGED INSTRUMENT PRACTICE DEVICE

(76) Inventor: Richard Martin Kopesec, 1225 Oak Trail, Roanoke, TX (US) 76262

( * ) Notice: Subject to any disclaimer, the term of this patent is extended or adjusted under 35 U.S.C. 154(b) by 306 days.

(21) Appl. No.: 10/790,922

(22) Filed: Mar. 2, 2004

(51) Int. Cl.
G10D 3/00 (2006.01)

(52) U.S. Cl. .......................... 84/293; 248/118

(58) Field of Classification Search ............... 84/290, 84/293, 267; 248/118.1, 118.5, 118, 118.3
See application file for complete search history.

(56) References Cited

U.S. PATENT DOCUMENTS

| | | | |
|---|---|---|---|
| 936,181 | A | 10/1909 | Steckelberg |
| 1,751,048 | A | 3/1930 | Miessner |
| 3,403,590 | A | 10/1968 | Quinton |
| D244,103 | S | 4/1977 | Greer |
| 4,031,801 | A | 6/1977 | Cecchini |
| 4,065,995 | A | 1/1978 | Greer |
| 4,112,804 | A | 9/1978 | Cecchini |
| 4,364,298 | A | 12/1982 | Piazza |
| 4,417,497 | A | 11/1983 | Nicklaus |
| D284,203 | S | 6/1986 | Landau |
| 5,158,255 | A | 10/1992 | Fuller |
| 5,163,646 | A | 11/1992 | Engelhardt |
| 5,197,699 | A | 3/1993 | Smith et al. |
| 5,358,203 | A | 10/1994 | Smith et al. |
| 5,451,020 | A | 9/1995 | Smith et al. |
| 5,568,907 | A | 10/1996 | Wolfe et al. |
| 5,628,483 | A | 5/1997 | Smith et al. |
| 5,713,544 | A | 2/1998 | Wolf et al. |
| 5,756,914 | A * | 5/1998 | Streibl .................... 84/465 |
| 5,811,704 | A | 9/1998 | Anderko |
| 6,017,006 | A | 1/2000 | Cherubini et al. |
| 6,050,964 | A | 4/2000 | Yates |
| 6,127,615 | A | 10/2000 | Rosenberg |
| 6,219,867 | B1 | 4/2001 | Yates |
| 6,494,418 | B1 | 12/2002 | Wolf et al. |
| 2005/0039592 | A1* | 2/2005 | Willard ................... 84/465 |
| 2005/0121562 | A1* | 6/2005 | Baumgardner ......... 248/118.1 |

OTHER PUBLICATIONS http://www.fretocizer.com—WhiteLightDesign, Inc., pp. 1-4, printed Sep. 20, 2004.

* cited by examiner

Primary Examiner—Kim Lockett
(74) Attorney, Agent, or Firm—Baker Botts L.L.P.

(57) ABSTRACT

A simulated stringed musical instrument practice device having integrally formed longitudinal ridges simulating strings is herein disclosed. The present invention generally comprises an elongated section of material that is similar in shape to the neck of a conventional stringed instrument. The elongated section has a flat surface fashioned thereon having transverse ridges simulating frets as well as longitudinal ridges integrally attached thereto simulating strings. The frets are spaced progressively longer distances apart in order to more accurately simulate the fret board of a conventional stringed instrument. Optionally, the present invention may also provide utility as a computer keyboard wrist rest. Non-slip footings are provided for attachment to the flat surface in order to provide for secure placement adjacent the keyboard of a computer in a manner similar to conventional wrist rests. A combination simulated stringed instrument and computer keyboard wrist rest having a multi-layered elongated section which deforms to the shape of a user's wrist while used as a keyboard wrist rest is also disclosed.

13 Claims, 2 Drawing Sheets

SIMULATED STRINGED INSTRUMENT PRACTICE DEVICE

CROSS-REFERENCE TO RELATED APPLICATIONS

Not applicable.

FIELD OF THE INVENTION

This invention relates to the field of stringed instrument practice devices, and more particularly, to a novel simulated stringed instrument practice device which may also posses utility as a computer keyboard wrist rest.

BACKGROUND OF THE INVENTION

The art of playing a guitar or other stringed instrument is a learned skill that requires many hours of practice in order to master. However in many instances, periodic practice of the stringed instrument in various environments such as the workplace or during travel are limited due to the instrument's large size as well as the relatively loud audible levels produced thereby. In addition, the intricate mechanisms common on most types of stringed instruments necessitates the need for special handling and storage means in order to insure no damage occurs during transportation. Guitars, mandolins, bass guitars, banjos, violins, cellos, contrabasses, and ukuleles comprise a list of stringed musical instruments which will hereinafter be referred to generally as "stringed instruments" due to their relatively similar structural design.

Stringed instrument practice devices have been developed which have attempted to simulate a conventional stringed instrument in order to facilitate the practice thereof. These practice devices heretofore devised and utilized are known to consist of familiar, expected, and obvious structural configurations. U.S. Pat. No. 6,127,615, to Rosenberg, discloses a training device for practicing rhythm hand techniques that uses a rectangular base with a plurality of tunable strings. A disadvantage of Rosenberg's device is that it provides no means for fingering hand practice or non-rhythm-hand techniques. U.S. Pat. No. 5,756,914, to Streibl, discloses a practice device which emulates only a portion (approximately 21 cm) the fret board of a stringed instrument. The '914 device requires height and tension adjustments to the strings and reconfiguration of frets to properly simulate different portions of the fret board. U.S. Pat. No. 4,112,804, to Cecchini, discloses a box-shaped device that is designed to create sound. It also provides a removable fingerboard that is stored therein. Because the '804 design deviates from the normal shape of a conventional stringed instrument neck, accurate simulation of an actual stringed instrument is not possible. U.S. Pat. No. 4,065,995, to Greer, discloses a hollow chamber which emulates a portion of a stringed instrument fret board together with a series of frets to permit a player to practice finger exercises in order to improve their finger strength. A disadvantage of Greer's design is the requirement of disassembly and restringing. Additionally, the '995 pocket size design provides limited means for holding the device while actually using the device for practice. A principle drawback of all of the aforementioned devices is that they require the use of actual strings thus necessitating the periodic adjustment and replacement thereof.

U.S. Pat. No. 3,403,590, to Quinton, discloses a practice fingerboard with an elongated rigid body having a flat-shaped, generally rectangular cross-section, with a beveled left edge and a flat right edge. A disadvantage of the '590 design is that it deviates greatly from the normal shape of a stringed instrument neck, thus having a flat, board-shaped cross-section which diminishes the aesthetic impression of a conventional stringed instrument. A second disadvantage of the '590 design is that accurate simulation of the gripping action of the fingering hand is not possible using this type of geometric structure. The gripping action is defined as the placement of the thumb portion and palm portion of the fingering hand over the lower surface of the neck of the instrument in order to provide a foundation from which fingerings may be made on the fretboard thereof. It is well known in the stringed instrument musician art that the gripping action and thus the thumb and palm position over the lower surface of the device may change many times throughout the duration of a single song, the simulation thereof, which is not made possible using the '590 design.

Additionally, many devices for supporting the wrists while operating a computer keyboard are known. As can be seen by reference to the following U.S. Pat. No. 6,494,418 to Wolf; U.S. Pat. No. 6,219,867 to Yates; U.S. Pat. No. 5,451,020 to Smith; and U.S. Pat. No. 5,158,255 to Fuller, the prior art is replete with myriad and diverse computer oriented support devices for a user's wrists. Nevertheless, none of these devices teach or suggest the additional utility of a simulated stringed instrument practice device.

While these devices fulfill their respective, particular objectives and requirements, there has remained a long-felt need for a stringed instrument practice device which is inexpensive, maintenance free, and easily transportable for the practice thereof when access to a conventional stringed instrument is not feasible. In addition, the utility of a conventional computer keyboard wrist rest could be further enhanced via implementation of a simulated stringed instrument practice device thereinto.

SUMMARY OF THE INVENTION AND OBJECTIVES

In view of the disadvantages inherent in the known types of stringed instrument practice devices, the present invention provides a solution to the aforementioned needs as well as other needs via a simulated stringed instrument practice device which is low cost and easily transported thereby enabling its use at any location and in all types of environments. The present invention generally comprises an elongated section of material that is relatively similar in shape to the neck of a conventional stringed instrument. The elongated section of material has a generally flat surface fashioned thereon with raised projections simulating frets of a conventional guitar. The flat surface also has raised projections integrally attached thereon which extend substantially normal to the frets in order to simulate the strings of a conventional stringed instrument. This design creates a very robust structure having no actual strings or associated attachment mechanisms thereby requiring costly assembly or periodic maintenance during use. In addition, this novel, unobvious design enables manufacture of a stringed instrument practice device wherein the neck portion, frets, and simulated strings are integrally molded from one piece, thus minimizing manufacturing costs.

Optionally, the present invention may provide novel, unobvious utility as a computer keyboard wrist rest. Non-slip footings are provided for attachment to the flat surface in order to provide for secure placement adjacent the keyboard of a computer in a similar manner to conventional wrist rests.

Accordingly, several objects and advantages of the present device are:

(a) to provide a practice device for silent finger practice for musicians that play stringed instruments.

(b) to provide a portable, compact practice device. The use of the present device allows a player to practice when an actual instrument would be awkward or impossible to use.

(c) to provide a practice device that approximates the shape and size of a stringed musical instrument neck, thereby facilitating the accurate simulation of stringed instrument play.

(d) to provide a practice device that requires no assembly, stringing, restringing, adjusting, tuning, or maintenance by the user.

(e) to provide a practice device that is of sufficient length to allow the user to hold the device while doing fingering exercises.

(f) to provide an ergonomic device that specifically supports the users wrists and forearms while operating a computer keyboard.

(g) to provide non-slip footings for secure placement when being used as a keyboard wrist rest.

Further objects and advantages of the present device will become apparent from a consideration of the drawings and ensuing description.

DETAILED DESCRIPTION OF THE PREFERRED EMBODIMENTS

Figure 1:
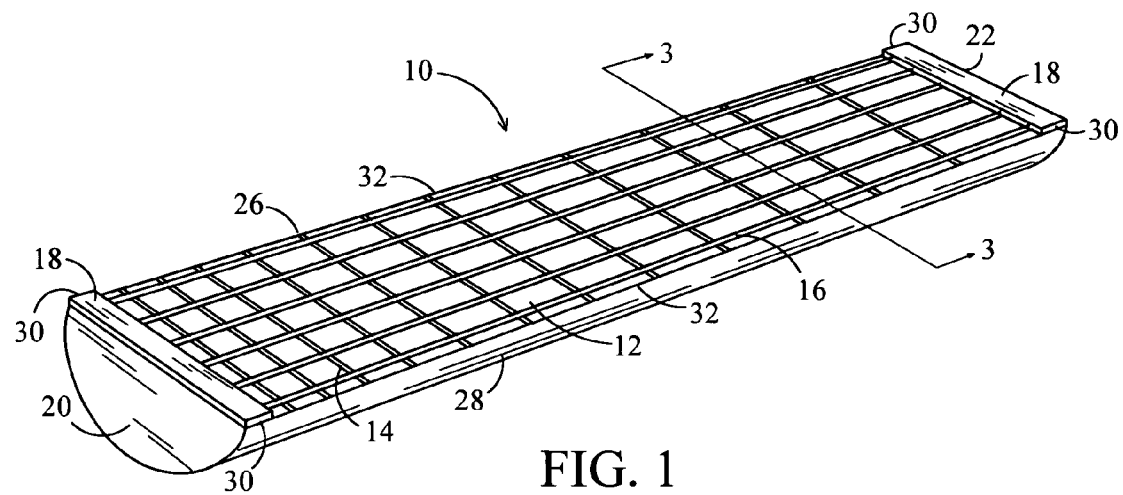
FIG. 1 shows a perspective view of one preferred embodiment according to the present invention showing the flat upper surface facing generally upwards.
Figure 2:
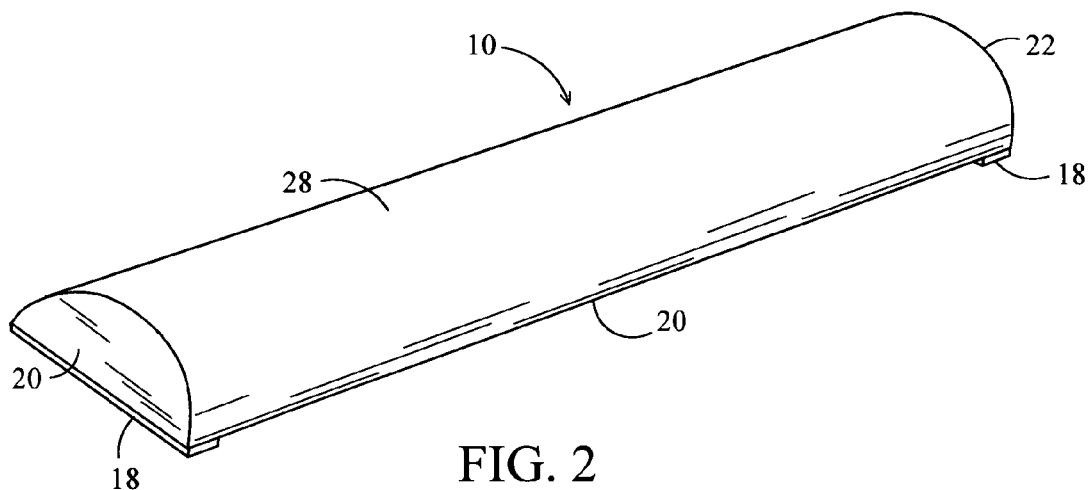
FIG. 2 shows a perspective view of the embodiment of FIG. 1 showing the lower surface of the elongated neck member facing generally upwards.
Figure 3:
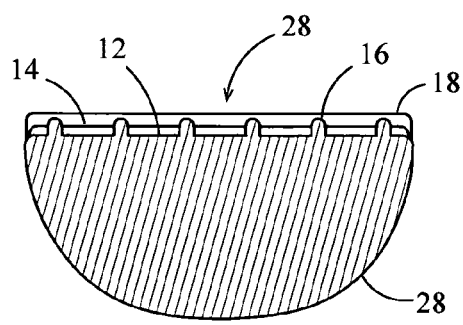
FIG. 3 shows a cross-sectional view of the embodiment of FIG. 1 as seen along the line 3—3 thereof.

A preferred embodiment of the present device 10 is illustrated in FIGS. 1 through 3. The present device generally comprises an elongated neck member 26 which is partially curved in lateral cross-section which extends longitudinally from a proximal 20 to a distal 22 end. The elongated neck member 26 has a generally flat shaped upper surface which extends the entire distance from the proximal end 20 to the distal end 22 thereof in order to simulate the fret board 12 of a conventional stringed instrument. The lower surface 28 of the elongated neck member 26 is generally semi-circular in shape, however it is well known in the art that varied types of conventional stringed instruments will have a lower surface of differing contoured shape and thus any shape which attempts to mimic the shape of the lower surface of a conventional stringed instrument may be implemented without departing from the spirit or scope of the invention. In addition, although the present embodiment has been described having a fret board which is flat in shape, it is well known in the art that the lateral extent of the fret board may be slightly convex in shape thus simulating the fret board of other stringed instruments such as violins, cellos, and the like. Nevertheless, the disclosed shape of the upper surface and lower surface gives the user an optimal and realistic workout feeling and best possible training results. Additionally, the elongated neck member 26 may optionally be tapered longitudinally from the proximal end 20 to the distal end 22 thus having the proximal end 20 larger in dimension than the distal end 22 in order to further simulate the actual shape of the neck of a conventional stringed instrument.

The fret board 12 has transverse ridges simulating frets 14 integrally formed on the surface thereof and are spaced progressively longer distances apart from the proximal end 20 to the distal end 22. In addition, integrally formed ridges simulating strings 16 extend longitudinally on the fret board 12 and intersect the frets 14 in a substantially perpendicular manner to simulate the fingerboard of a stringed instrument. The elongated member 26, frets 14, and simulated strings 16 are integrally molded from one piece of thermoplastic such as polyurethane of essentially any hardness, preferably having a hardness from about 40 shore D to 95 shore D as measured by ASTM (American Society for Testing and Materials). However, it is to be appreciated that the present invention may be made from a material of any hardness that will allow the user to feel the frets 14 and simulated strings 16 during use, thereby providing an adequate stringed instrument practice tool.

Optionally, the present invention may be configured for use as a wrist rest for a computer keyboard. Non-slip footings 18 are provided which are made of any material having a high degree of surface friction such as neoprene having an elongated generally rectangular solid cross-section member defining ends 30 which terminate proximate the side edges 32 of the fret board 12. The footings 18 are attached to the fret board 12 proximate the proximal 20 and distal 22 ends using glue or other suitable adhesive. The footings allow the present invention to be used as a conventional wrist rest by providing a non-slip support surface for the flat upper surface while positioned in front a typical computer keyboard.

Figure 4:
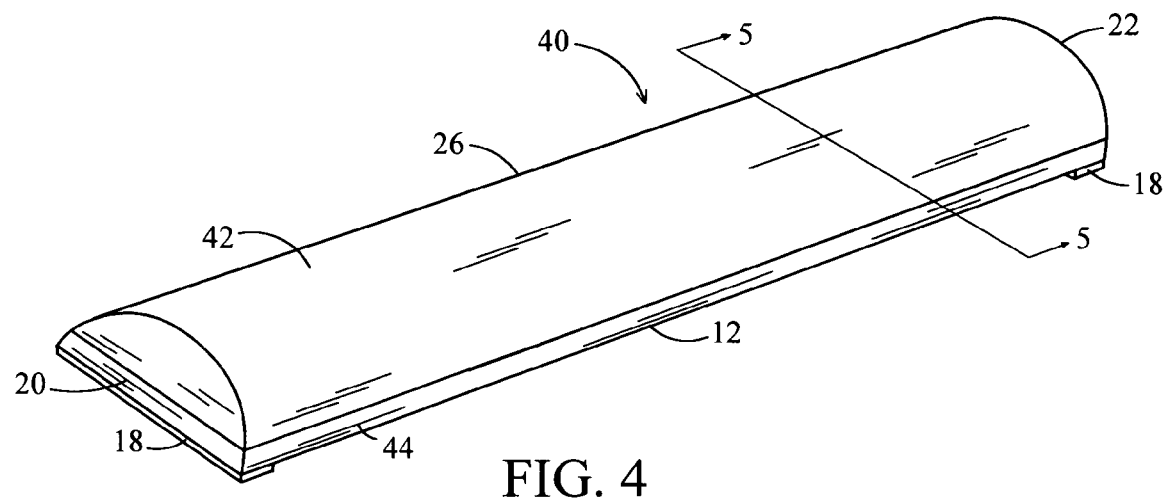
FIG. 4 shows a perspective view of another embodiment according to the present invention showing the lower surface of the elongated neck member facing generally upwards.
Figure 5:
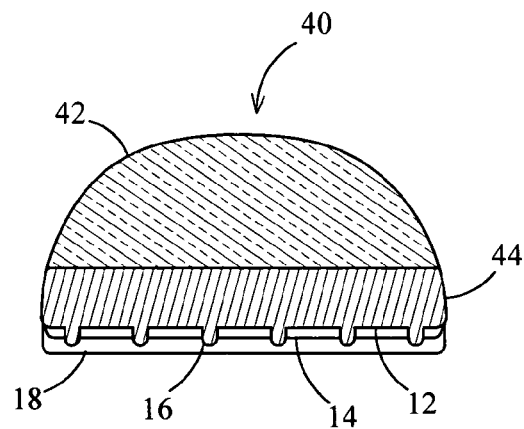
FIG. 5 shows a cross-sectional view of the embodiment of FIG. 4 as seen along the line 5—5 thereof, showing the configuration of the fret board layer and the wrist support layer.

An alternative embodiment 40 of the present invention presents a combination stringed musical instrument practice device and computer keyboard wrist rest wherein the elongated neck member 26 is comprised of two layers of material of differing hardness which extend substantially from the proximal 20 to the distal 22 end thereof as shown in FIGS. 4 and 5. The fret board 12, frets 14, simulated strings 16, and footings 18, and cross-sectional shape of the elongated neck member 26 are similar in design and function to the device 10 of FIGS. 1 through 3. The embodiment of FIGS. 4 and 5 differs in that the elongated neck member 26 comprises a soft wrist support layer 42 that is attached to a relatively harder fret board layer 44 using glue or other suitable attachment means. The fret board layer 44 is made of a relatively rigid material such as polyurethane having a hardness from about 40 shore D to 95 shore D in order to closely simulate the feel of a fret board of a conventional stringed instrument. Conversely, the wrist support layer 42 is made of a softer material such as polyurethane foam which is sufficiently soft so that it deforms due to the downward force of a typical user's wrist thus generally conforming to the shape thereof when used as a wrist rest of a computer keyboard. The present embodiment disclosed the use of polyurethane foam, however it is well known in the art of computer wrist rests that the wrist support layer may be made of any material that provides a cushion effect to the wrists of a user when used as a wrist rest.

To use as a simulated stringed instrument practice device, the device (10 and 40) is grasped by the rhythm hand of a user near the proximal end 20 thereof. Then device is preferably positioned at an angle in front of the body in order to approximate the neck position normally maintained when playing a conventional stringed instrument. The fingering hand may then be freely positioned at various locations along the neck 26 allowing the user to practice fingering techniques common to the playing of a stringed instrument, such as chords, scales, and progressions. The rhythm hand is defined as the right hand of a right-handed user and the left hand of a left-handed user. Conversely, the fingering hand is defined as the left hand of a right-handed user and the right hand of a left-handed user. When used as a computer keyboard wrist rest, the device (10 and 40) is laid in front of a conventional computer keyboard with the fret board 12 facing downwards and the footings 18 in contact with the support surface. When typing at the keyboard, the wrists of the user are laid upon the lower surface 42 in a similar manner to conventional computer keyboard wrist rests.

Thus, the reader will see that the present device provides a silent, portable, and compact device that approximates the shape and size of a stringed instrument neck. This will provide for accurate simulation of stringed instrument play. It further provides a practice device that requires no assembly, stringing, restringing, adjusting, tuning, or maintenance by the user. The present device is of sufficient length to allow the user to hold the device while doing fingering exercises. Furthermore, the present device provides an ergonomic device that specifically supports the user's wrists and forearms while operating a computer keyboard. The non-slip footings provide for secure placement on a flat surface when being used as a keyboard wrist rest.

While the above description contains many specificities, these should not be construed as limitations on the scope of the invention, but rather as an exemplification of one preferred embodiment thereof. Many other variations are possible. For example, alternate embodiments can be configured to emulate stringed musical instruments with 3, 4, 5, 6, or 12 strings. Accordingly, the scope of the present device should be determined not by the embodiment illustrated, but by the appended claims and their legal equivalents.

I claim:

1. A simulated stringed musical instrument practice device comprising:
    an elongated neck member defining proximal and distal ends, said neck member having a generally flat shaped upper surface which extends longitudinally from said proximal end to said distal end thereby defining lateral edges thereof which are generally perpendicular to said proximal and said distal ends, said elongated neck member also having a lower surface which extends substantially from said proximal end to said distal end, said lower surface having lateral edges which are attached to the lateral edges of said upper surface, wherein said lower surface is generally arcuate in shape in order to simulate the shape of a conventional stringed instrument;
    a plurality of longitudinally spaced, transversely extending ridges which are integrally attached to said flat upper surface, said transversely extending ridges are spaced progressively longer distances apart from said proximal end to said distal end, whereby said transversely extending ridges simulates the frets of a conventional stringed instrument;
    a plurality of longitudinal ridges which extend from said proximal end to said distal end over said flat upper surface, said longitudinal ridges are integrally attached to said flat upper surface, whereby said longitudinal ridges simulates the strings of said conventional stringed instrument; and
    a footing means which are attached to said flat upper surface for providing a non-slip support surface for the flat upper surface, thereby enabling the use of said simulated stringed musical instrument device as a conventional computer keyboard wrist rest.

2. The simulated stringed musical instrument device of claim 1, wherein the lower surface of said elongated neck member is semi-circular in shape.

3. The simulated stringed musical instrument device of claim 1, wherein said elongated neck member tapers longitudinally from said proximal end to said distal end.

4. The simulated stringed musical instrument device of claim 1, wherein said elongated neck member, said transversely extending ridges, and said longitudinal ridges are integrally formed from one piece of material.

5. The simulated stringed musical instrument device of claim 4, wherein said material is plastic.

6. The simulated stringed musical instrument device of claim 1, wherein said plurality of longitudinal ridges is a quantity of 3, 4, 5, 6, or 12 longitudinal ridges.

7. The simulated stringed musical instrument device of claim 1, wherein said elongated neck member further comprises:
    a fret board layer which extends substantially from said proximal end to said distal end, said fret board layer having an upper surface defining said generally flat upper surface and a lower surface which is substantially parallel to said flat upper surface; and,
    a wrist support layer which extends substantially from said proximal end to said distal end, said wrist support layer having an upper surface which is attached to the lower surface of said fret board layer, said wrist support layer is sufficiently soft so that it deforms to the shape of a user's wrist when used as a wrist rest of a computer keyboard.

8. The simulated stringed instrument device of claim 1, wherein the lateral extent of said generally flat shaped upper surface is convex in shape.

9. A method for supporting the wrists of a user while using a computer keyboard, said steps comprising:
    providing a device which comprises an elongated neck member defining proximal and distal ends, said neck member having a generally flat shaped upper surface which extends longitudinally from said proximal end to said distal end, a plurality of longitudinally spaced, transversely extending ridges which are integrally attached to said flat upper surface, said transversely extending ridges are spaced progressively longer distances apart from said proximal end to said distal end, whereby said transversely extending ridges simulates the frets of a conventional stringed instrument, a plurality of longitudinal ridges which extend from said proximal end to said distal end over said flat upper surface, said longitudinal ridges are integrally attached to said flat upper surface, whereby said longitudinal ridges simulates the strings of said conventional stringed instrument, and footing means which are attached to said flat upper surface for providing a non-slip support surface for the flat upper surface;

placing said device on a flat surface in front of a conventional computer keyboard; and, resting the wrists of said user on said device while using said computer keyboard.

10. The method of claim 9, wherein said elongated neck member further comprises:

a fret board layer which extends substantially from said proximal end to said distal end, said fret board layer having an upper surface defining said flat upper surface and a lower surface which is substantially parallel to said flat upper surface; and, a wrist support layer which extends substantially from said proximal end to said distal end, said wrist support layer having an upper surface which is attached to the lower surface of said fret board layer, said wrist support layer is sufficiently soft so that it deforms to the shape of a user's wrist when used as a wrist rest of a computer keyboard.

11. The method of claim 9, wherein said elongated neck member tapers longitudinally from said proximal end to said distal end.

12. The method of claim 9, wherein said elongated neck member, said transversely extending ridges, and said longitudinal ridges are integrally formed from one piece of material.

13. The method of claim 12, wherein said material is plastic.

* * * * *